United States Patent
Aritomi

(10) Patent No.: US 10,991,516 B2
(45) Date of Patent: Apr. 27, 2021

(54) SOLID ELECTROLYTIC CAPACITOR

(71) Applicant: Murata Manufacturing Co., Ltd., Nagaokakyo (JP)

(72) Inventor: Katsutomo Aritomi, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 122 days.

(21) Appl. No.: 16/376,368

(22) Filed: Apr. 5, 2019

(65) Prior Publication Data

US 2019/0228916 A1    Jul. 25, 2019

Related U.S. Application Data

(63) Continuation of application No. PCT/JP2017/039743, filed on Nov. 2, 2017.

(30) Foreign Application Priority Data

Nov. 4, 2016 (JP) .............................. JP2016-216262

(51) Int. Cl.
| | |
|---|---|
| H01G 9/15 | (2006.01) |
| H01G 9/07 | (2006.01) |
| H01G 9/10 | (2006.01) |
| H01G 9/048 | (2006.01) |

(52) U.S. Cl.
CPC .............. *H01G 9/15* (2013.01); *H01G 9/048* (2013.01); *H01G 9/07* (2013.01); *H01G 9/10* (2013.01)

(58) Field of Classification Search
CPC ........................................................ H01G 9/15
USPC ........................................................ 361/541
See application file for complete search history.

(56) References Cited

U.S. PATENT DOCUMENTS

| | | | | |
|---|---|---|---|---|
| 2007/0247781 | A1* | 10/2007 | Baba ................. | H01G 9/14 361/272 |
| 2009/0080144 | A1* | 3/2009 | Matumoto ........... | H01G 11/48 361/528 |
| 2009/0080146 | A1* | 3/2009 | Horio ................. | H01G 9/08 361/541 |
| 2013/0010404 | A1* | 1/2013 | Chiu .................. | H01G 9/10 361/526 |

(Continued)

FOREIGN PATENT DOCUMENTS

| | | |
|---|---|---|
| JP | H06232012 A | 8/1994 |
| JP | 2003045754 A | 2/2003 |

(Continued)

OTHER PUBLICATIONS

International Search Report issued for PCT/JP2017/039743, dated Feb. 6, 2018.

(Continued)

*Primary Examiner* — Eric W Thomas
(74) *Attorney, Agent, or Firm* — Arent Fox LLP

(57) ABSTRACT

A solid electrolytic capacitor that includes a plurality of capacitor elements laminated in parallel, and an exterior resin that seals the plurality of capacitor elements. Each of the plurality of capacitor elements includes a valve action metal base, an oxide film dielectric layer on a surface of the valve action metal base, and a cathode layer on a surface of the dielectric layer, and at least one capacitor element among the plurality of capacitor elements has a thicker oxide film dielectric layer than that of another capacitor element.

11 Claims, 1 Drawing Sheet

(56) References Cited

U.S. PATENT DOCUMENTS

2013/0058002 A1* 3/2013 Oh .......................... H01G 2/06
361/301.4

FOREIGN PATENT DOCUMENTS

| JP | 2003243257 A | 8/2003 |
|----|--------------|--------|
| JP | 2008135427 A | 6/2008 |
| JP | 2012033544 A | 2/2012 |
| JP | 2012044112 A | 3/2012 |

OTHER PUBLICATIONS

Written Opinion of the International Searching Authority issued for PCT/JP2017/039743, dated Feb. 6, 2018.

* cited by examiner

SOLID ELECTROLYTIC CAPACITOR

CROSS REFERENCE TO RELATED APPLICATIONS

The present application is a continuation of International application No. PCT/JP2017/039743, filed Nov. 2, 2017, which claims priority to Japanese Patent Application No. 2016-216262, filed Nov. 4, 2016, the entire contents of each of which are incorporated herein by reference.

FIELD OF THE INVENTION

The present invention relates to a solid electrolytic capacitor.

BACKGROUND OF THE INVENTION

As an example of a small-size solid electrolytic capacitor with a large capacity, Patent Document 1 discloses a solid electrolytic capacitor with a structure in which, at a predetermined position on a valve action metal foil in which a dielectric oxide film layer is formed on its surface, an insulation portion is provided so as to separate an anode electrode forming portion and a cathode forming portion, then, on the cathode forming portion, a solid electrolyte layer made from a conductive polymer and a cathode layer including a carbon layer and a silver paste layer are laminated sequentially so that a cathode electrode portion is formed for a capacitor element, and a plurality of such capacitor elements is laminated.

Patent Document 1: Japanese Patent Application Laid-Open No. 2008-135427

SUMMARY OF THE INVENTION

In the conventional solid electrolytic capacitor as disclosed in Patent Document 1, since it is possible to reduce the internal resistance of the whole of an anode portion and a cathode portion at the time of laminating capacitor elements, it is said that it is possible to obtain a solid electrolytic capacitor with a low equivalent series resistance (ESR).

However, even if the initial value of the ESR, i.e., the ESR immediately after the manufacture, is low, it has been known that in the case where the capacitor has been used under high temperature, the ESR may increase in some cases. Thus, since there is no correlation between the initial value of the ESR and the thermal stability of the ESR, development of a solid electrolytic capacitor excellent in thermal stability of the ESR is required.

The present invention has been achieved in order to solve the above-described problems, and an object is to provide a solid electrolytic capacitor in which a change of the ESR with time in the case of being exposed to high temperature is small.

A solid electrolytic capacitor according to an aspect of the preset invention includes a plurality of capacitor elements laminated in parallel, and an exterior resin that seals the plurality of capacitor elements, wherein each of the plurality of capacitor elements includes a valve action metal base, an oxide film dielectric layer on a surface of the valve action metal base, and a cathode layer on a surface of the dielectric layer, and at least one capacitor element among the plurality of capacitor elements has a thicker oxide film than that of another capacitor element.

In the solid electrolytic capacitor according to the present invention, among the plurality of capacitor elements, a thickest oxide film dielectric layer is preferably 1.5 or more times a thickness of the thinnest oxide film dielectric layer, and is particularly preferably 3.0 or more times the thickness of the thinnest oxide film dielectric layer.

The present invention provides a solid electrolytic capacitor in which a change of the ESR with time in the case of being exposed to high temperature is small.

DESCRIPTION OF PREFERRED EMBODIMENTS OF THE INVENTION

Hereinafter, a solid electrolytic capacitor of the present invention will be described. However, the present invention is not limited to a configuration described in the below and the configuration can be applied by being changed appropriately within a range where the gist of the present invention is not changed. A configuration obtained by combining two or more of individual desirable configurations of the present invention described in the below is also included in the present invention.

In the solid electrolytic capacitor of the present invention, a plurality of capacitor elements is laminated in parallel, and these capacitor elements are sealed with exterior resin.

Hereinafter, an example in which six capacitor elements are laminated will be described. However, the number of capacitor elements included in the solid electrolytic capacitor of the present invention is not limited specifically as long as the number of capacitor elements is two or more.

Figure 1:
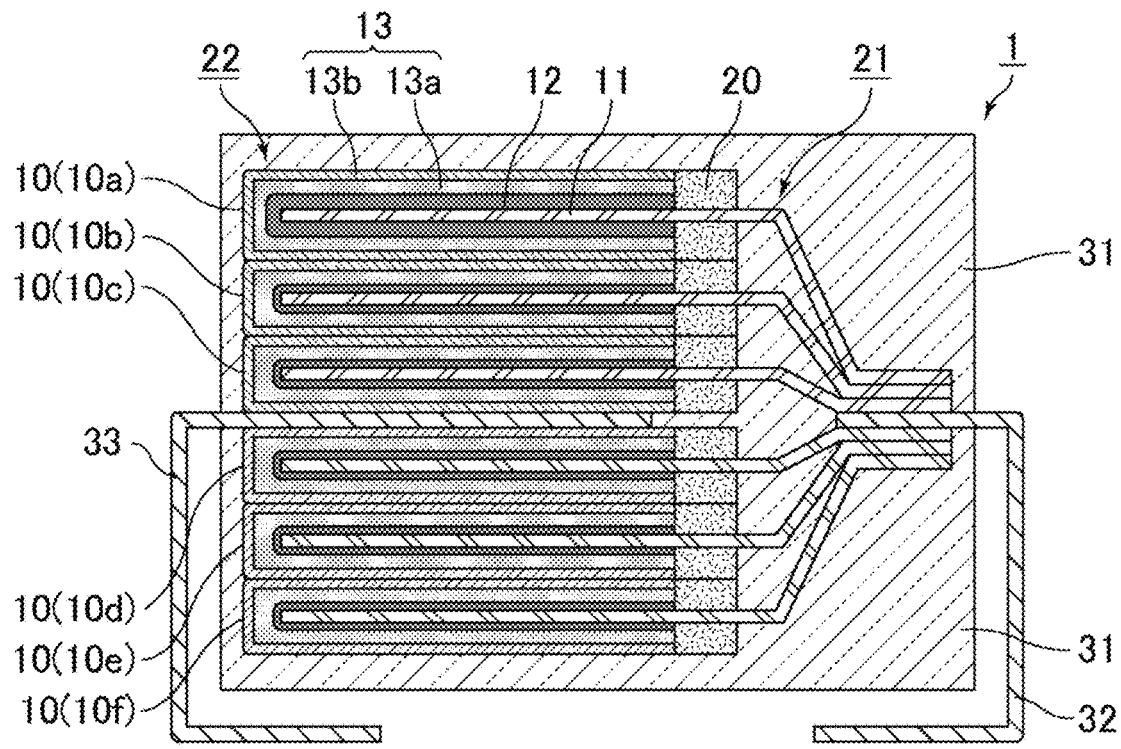
FIG. 1 is a cross sectional view showing schematically one example of a solid electrolytic capacitor of the present invention.
Figure 2:
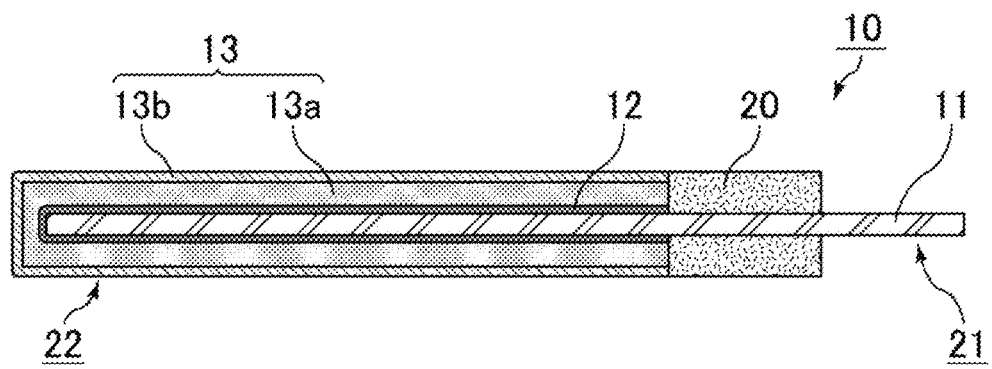
FIG. 2 is a cross sectional view showing schematically one example of a capacitor element constituting a solid electrolytic capacitor of the present invention.

FIG. 1 is a cross sectional view showing schematically one example of a solid electrolytic capacitor of the present invention. FIG. 2 is a cross sectional view showing schematically one example of a capacitor element that constitutes a solid electrolytic capacitor of the present invention.

A solid electrolytic capacitor 1 shown in FIG. 1 includes six capacitor elements 10 (10a, 10b, 10c, 10d, 10e, and 10f), an exterior resin 31, an anode terminal 32, and a cathode terminal 33.

The exterior resin 31 is formed to cover the whole capacitor elements 10, a part of the anode terminal 32, and a part of the cathode terminal 33. As materials of the exterior resin 31, an epoxy resin or the like is cited, for example.

As shown in FIG. 2, each of the capacitor elements 10 constituting the solid electrolytic capacitor 1 includes a valve action metal base 11, and a dielectric layer 12 made from an oxide film and provided on a part of the surface of the valve action metal base 11. At one end portion on one side of the valve action metal base 11, an anode portion 21 is formed, and on the valve action metal base 11, an insulating layer 20 having a prescribed width is provided peripherally as an insulation portion with coming in contact with the anode portion 21. In FIG. 2, the dielectric layer 12 is provided on a portion of the valve action metal base 11 except the anode portion 21 and the insulating layer 20. On the dielectric layer 12, a cathode layer 13 is provided, and in FIG. 2, the cathode layer 13 includes a solid electrolyte layer 13a provided on the surface of the dielectric layer 12 and a current collecting layer 13b provided on the surface of the solid electrolyte layer 13a. A cathode portion 22 is formed by the cathode layer 13. The dielectric layer 12 may be provided on a portion of the valve action metal base 11 where the insulating layer 20 is provided, and further, may be provided on a part of the anode portion 21.

In the solid electrolytic capacitor 1 shown in FIG. 1, the capacitor elements 10a, 10b, and 10c are laminated, and the respective cathode layers 13 of the capacitor elements 10a, 10b, and 10c are joined integrally with, for example, a conductive paste (not shown), such as a silver paste. Similarly, the capacitor elements 10d, 10e, and 10f are laminated, and the respective cathode layers 13 of the capacitor elements 10d, 10e, and 10f are joined integrally with, for example, a conductive paste (not shown), such as a silver paste.

An anode terminal 32 is made from metal materials and is formed as a lead frame on the anode portion 21 side. The respective anode portions 21 of the valve action metal bases 11 are joined to each other and the anode portions 21 of the valve action metal bases 11 are joined integrally to the anode terminal 32 by, for example, welding such as resistance welding or pressure bonding.

A cathode terminal 33 is made from metal materials and is formed as a lead frame on the cathode portion 22 side.

The cathode layer 13 of the capacitor element 10c or 10d and the cathode terminal 33 are joined integrally with, for example, a conductive paste (not shown), such as a silver paste.

In the solid electrolytic capacitor of the present invention, the valve action metal base is made from valve action metals that show a so-called valve action.

As the valve action metals, for example, cited are a metal simple substance, such as aluminum, tantalum, niobium, titanium, and zirconium, or an alloy containing these metals. Among them, aluminum or an aluminum alloy is preferable.

The shape of the valve action metal base is preferably a flat plate shape and is more preferably a foil shape. Moreover, the valve action metal base has preferably a structure including a porous portion on the surface of a core portion and is more preferably provided with a porous layer, such as an etching layer on the surface of a core portion.

In the solid electrolytic capacitor of the present invention, the dielectric layer is made from an oxide film of the above-described valve action metal. It is preferable that the dielectric layer is provided on the surface of a porous portion of the valve action metal base. For example, in the case where an aluminum foil is used as the valve action metal base, by performing anodizing treatment (also referred to as chemical conversion treatment) for the surface of the aluminum foil in an aqueous solution containing adipic acid ammonium and the like, a dielectric layer made from an oxide film can be formed.

Among a plurality of capacitor elements constituting the solid electrolytic capacitor of the present invention, the oxide film of at least one capacitor element is thicker than the oxide film of another capacitor element.

In the solid electrolytic capacitor 1 shown in FIG. 1, among the six capacitor elements 10a, 10b, 10c, 10d, 10e, and 10f, the oxide film of the capacitor element 10a is thicker than the oxide films of the other capacitor elements 10b, 10c, 10d, 10e, and 10f.

The thicknesses of the oxide films of the capacitor elements 10b, 10c, 10d, 10e, and 10f other than the capacitor element 10a are the same.

In the case where the solid electrolytic capacitor is exposed to high temperature, it is estimated that the ESR will increases because the dielectric layer made from an oxide film peels off from the surface of a valve action metal base or exfoliation is caused between the dielectric layer and the cathode layer. In the solid electrolytic capacitor of the present invention, among a plurality of capacitor elements, the oxide film of at least one capacitor element is made thicker. The synthetic ESR of a solid electrolytic capacitor depends on a capacitor element with a low ESR. Since the thickness of an oxide film of the capacitor element with a low ESR is thicker, even if the solid electrolytic capacitor is exposed to the high temperature, it is possible to suppress the above-mentioned exfoliation of the dielectric layer, and the ESR is harder to change.

In the solid electrolytic capacitor 1 shown in FIG. 1, the oxide film of the capacitor element 10a disposed on the end portion is made thicker. However, in the solid electrolytic capacitor of the present invention the disposed position of the capacitor element whose oxide film is thick is not limited specifically, as long as the plurality of capacitor elements is laminated in parallel. In consideration of manufacture efficiency, it is preferable that the oxide film of a capacitor element whose laminating order is the first or the last is thick. For example, in the solid electrolytic capacitor 1 shown in FIG. 1, it is preferable that the oxide film of the capacitor elements 10a, 10c, 10d, or 10f is thick.

In the solid electrolytic capacitor of the present invention, it is preferable that the thicknesses of the oxide films of the capacitor elements other than the capacitor element whose oxide film is thick are substantially the same. In this case, the solid electrolytic capacitor of the present invention includes, as a capacitor element, only a capacitor element whose oxide film is the thickest and a capacitor element whose oxide film is the thinnest. In this way, it is preferable that the solid electrolytic capacitor of the present invention includes, as a capacitor element, only a capacitor element whose oxide film is the thickest and a capacitor element whose oxide film is the thinnest. However, the solid electrolytic capacitor may include a capacitor element other than the capacitor element whose oxide film is the thickest and the capacitor element whose oxide film is the thinnest.

In the present specification, it is assumed that a capacitor element whose oxide film has a thickness falling within ±10% of the thickness of the thickest oxide film is included in "the capacitor element whose oxide film is the thickest". Similarly, it is assumed that a capacitor element whose oxide film has a thickness falling within ±10% of the thickness of the thinnest oxide film is included in "the capacitor element whose oxide film is the thinnest".

Among the plurality of capacitor elements constituting the solid electrolytic capacitor of the present invention, the thickness of the oxide film of a capacitor element whose oxide film is the thickest is preferably 1.5 or more times the thickness of the oxide film of a capacitor element whose oxide film is the thinnest, is more preferably 2.0 or more times the above thickness, and is particularly preferably 3.0 or more times the above thickness. The thickness of the oxide film of a capacitor element whose oxide film is the thickest may be 3.5 or more times the thickness of the oxide film of a capacitor element whose oxide film is the thinnest, may be 4.0 or more times the above thickness, or may be 4.5 or more times the above thickness. Moreover, the thickness of the oxide film of a capacitor element whose oxide film is the thickest may be 20 or less times the thickness of the oxide film of a capacitor element whose oxide film is the thinnest. As a difference in the thickness of the oxide film becomes larger, it is possible to suppress a change of the ESR with time.

In the case where there exists a plurality of capacitor elements whose oxide film is the thickest, the average value of the thicknesses of these oxide films is "the thickness of the thickest oxide film of the capacitor element". Similarly, in the case where there exists a plurality of capacitor elements whose oxide film is the thinnest, the average value of the thicknesses of these oxide films is "the thickness of the thinnest oxide film of the capacitor element".

The solid electrolytic capacitor of the present invention may include at least one capacitor element having an oxide film thicker than the oxide films of other capacitor elements. The solid electrolytic capacitor of the present invention may include two or more capacitor elements each having the oxide film thicker than the oxide films of other capacitor elements. However, from the viewpoint of making the capacitance of the whole capacitor large, it is preferable that the number of the capacitor elements with a thick oxide film is smaller.

In the solid electrolytic capacitor of the present invention, in order to separate an anode portion and a cathode portion reliably, it is preferable that the insulating layer is provided peripherally to the valve action metal base. As materials of the insulating layer, for example, cited are insulating resins, such as a polyphenyl sulfone resin, a polyether sulfone resin, a cyanate ester resin, a fluororesin (tetrafluoroethylene, tetrafluoroethylene-perfluoroalkyl vinyl ether copolymer, etc.), a polyimide resin, a polyamide imide resin, and their derivatives or precursors.

In the solid electrolytic capacitor of the present invention, it is preferable that as a cathode layer, a solid electrolyte layer is provided on the surface of the dielectric layer. It is more preferable that on the surface of the solid electrolyte layer, there is provided the current collecting layer.

As materials constituting the solid electrolyte layer, for example, cited are conductive polymers, such as polypyrroles, polythiophenes, and poly anilines. Among them, polythiophenes are preferable, and poly (3,4-ethylenedioxy thiophene) called PEDOT is particularly preferable.

Moreover, the above-described conductive polymers may contain dopants, such as polystyrene sulfonate (PSS).

It is preferable that the current collecting layer includes a carbon layer being an underlying layer and a silver layer provided on the carbon layer. However, the current collecting layer may include only the carbon layer or only the silver layer.

The solid electrolytic capacitor of the present invention is manufactured as follows preferably.

First, on the surface of a valve action metal base, a dielectric layer made from an oxide film is formed.

The oxide film is formed by performing anodizing treatment (also referred to as chemical conversion treatment) on the surface of the valve action metal base. At this time, as the formation voltage is made higher, a thicker oxide film can be formed. Accordingly, by adjusting the formation voltage, it is possible to produce a plurality of valve action metal bases in which respective dielectric layers different in the thickness of an oxide film are formed.

Before forming the cathode layer, it is preferable to form an insulating layer on the surface of an insulating layer forming portion of the valve action metal base. The insulating layer is formed by coating materials, such as an insulating resin onto the surface of the valve action metal base and by solidifying or hardening the materials with heating or the like. The formation of the insulating layer may be performed before forming the dielectric layer.

Next, on the surface of the dielectric layer, a cathode layer is formed. As the cathode layer, it is preferable to form a solid electrolyte layer on the surface of the dielectric layer. In this case, for example, it is possible to form the solid electrolyte layer by a method of forming a polymerized film of poly (3,4-ethylenedioxy thiophene) and the like on the surface of the dielectric layer by using a treatment liquid containing monomers such as 3,4-ethylenedioxythiophene or a method of coating a dispersion liquid of polymer, such as poly (3,4-ethylenedioxy thiophene) on the surface of the dielectric layer and drying the coated liquid.

It is still more preferable to form a current collecting layer on the solid electrolyte layer. As the current collecting layer, it is preferable to form a carbon layer and a silver layer by laminating them sequentially. However, only the carbon layer may be formed, or only the silver layer may be formed. For example, it is possible to form the carbon layer and the silver layer by coating and drying a carbon paste and, thereafter, by coating and drying a silver paste. Thus, the plurality of capacitor elements different in the thickness of an oxide film is produced.

Successively, the plurality of capacitor elements is laminated so as to include at least one capacitor element whose oxide film is thicker than the oxide films of other capacitor elements. As mentioned in the above, it is preferable to laminate a capacitor element having a thick oxide film at the beginning or at the last. At the time of the laminating, the anode portions of the valve action metal bases are joined to each other, and, in addition, an anode terminal is joined to the anode portions. As the joining method, for example, welding, pressure bonding, etc. are cited. Moreover, by using a conductive paste, such as a silver paste, the cathode layers are laminated so as to come in contact with each other, and a cathode terminal is joined to the cathode layers.

Thereafter, the sealing is performed to cover the whole capacitor elements, a part of the cathode terminal, and a part of the anode terminal with the exterior resin.

The exterior resin is formed by, for example, a transfer mold. By the above, the solid electrolytic capacitor is obtained.

Example

Hereinafter, shown are Examples in which the solid electrolytic capacitors of the present invention have been disclosed more concretely. It should be noted that the present invention should not be limited only to these Examples.

(Production of Capacitor Element)

First, as a valve action metal base, an aluminum chemical conversion foil having an etching layer on its surface was prepared. In order to prevent a short circuit between an anode portion and a cathode portion, at a position separated with a predetermined space from one end, in a long axis direction, of the aluminum chemical conversion foil, a belt-shaped insulating layer was formed to surround the aluminum chemical conversion foil.

Next, a dielectric layer made from an oxide film was formed to cover the aluminum chemical conversion foil.

The oxide film was formed by performing a chemical conversion treatment in which the surface of the aluminum chemical conversion foil was immersed in an adipic acid aluminum aqueous solution to apply voltage.

The relationship between the formation voltage and the thickness of an oxide film is shown in the following chart:

| Formation Voltage | Thickness |
|---|---|
| 2 V | 2.6 nm |
| 2.5 V | 3.3 nm |
| 4 V | 5 nm |
| 6.3 V | 8 nm |
| 10 V | 13 nm |
| 16 V | 21 nm |
| 25 V | 33 nm |
| 34 V | 45 nm |
| 50 V | 66 nm |
| 60 V | 80 nm |
| 76 V | 100 nm |

Figure 3:
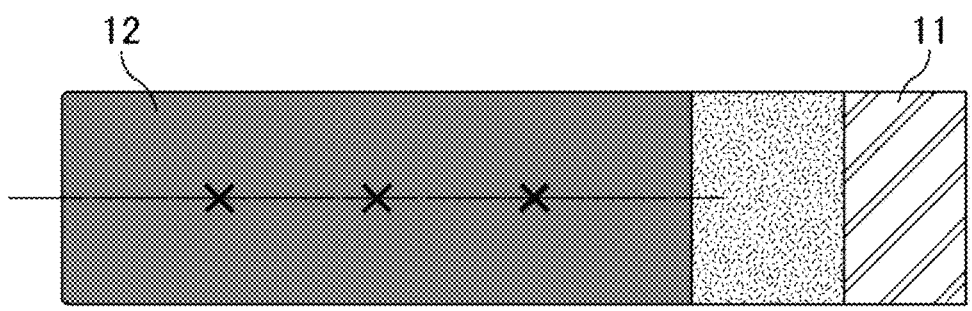
FIG. 3 is a plan view for describing a measuring method of a thickness of an oxide film.

FIG. 3 is a plan view for describing a measuring method of the thickness of an oxide film.

At three points (three positions with an x mark on a one dot chain line in FIG. 3) on the a straight line in the vicinity of the center of the valve action metal base 11, the thickness of the dielectric layer 12 made from an oxide film was measured by using the transmission electron microscope (TEM). For one sample, thickness was measured at three points on the obverse surface and at three points on the reverse surface, and the average value of 10 samples formed with the same formation voltage was made the thickness of the oxide film.

Thereafter, a large area portion (etching layer) of the aluminum chemical conversion foil divided with the insulating layer was impregnated with a dispersion liquid of a conductive polymer (PEDOT:PSS), to form a solid electrolyte layer. Furthermore, a carbon paste was coated and dried and then a silver paste was coated and dried, to form the carbon layer and the silver layer. Thus, the capacitor elements different in the thickness of an oxide film were produced.

Comparative Example 1

Five capacitor elements whose respective oxide films have a thickness of 21 nm were laminated and were sealed with an exterior resin, whereby a solid electrolytic capacitor of Comparative example 1 was produced.

Example 1

One capacitor element whose oxide film has a thickness of 33 nm and four capacitor elements whose respective oxide films have a thickness of 21 nm were laminated and were sealed with an exterior resin, whereby a solid electrolytic capacitor of Example 1 was produced.

For the solid electrolytic capacitor of each of Comparative example 1 and Example 1, an equivalent series resistance (ESR) at 100 kHz was measured by the four-terminal method with using an LCR meter (manufactured by Agilent Technologies), and the measured value was made an initial value of the ESR. Furthermore, for these solid electrolytic capacitors, the high temperature load test in which the solid electrolytic capacitors was left at 125° C. for 1000 hours was conducted, and then the ESR at 100 kHz was measured.

The capacitor elements constituting the solid electrolytic capacitor of Comparative example 1 and the measurement results of the ESR are shown in Table 1, and the capacitor elements constituting the solid electrolytic capacitor of Example 1 and the measurement results of the ESR are shown in Table 2.

TABLE 1

| Comparative example 1 | |
|---|---|
| Element | Oxide film thickness |
| 1 | 21 nm |
| 2 | 21 nm |
| 3 | 21 nm |
| 4 | 21 nm |
| 5 | 21 nm |

| ESR | |
|---|---|
| Initial value | 125° C./1000 hr |
| 20 mΩ | 100 mΩ |

TABLE 2

| Example 1 | |
|---|---|
| Element | Oxide film thickness |
| 1 | 33 nm |
| 2 | 21 nm |
| 3 | 21 nm |
| 4 | 21 nm |
| 5 | 21 nm |

| ESR | |
|---|---|
| Initial value | 125° C./1000 hr |
| 20 mΩ | 50 mΩ |

From Table 1 and 2, it was confirmed that a change of the ESR with time is small and the ESR is kept low in the solid electrolytic capacitor of Example 1 that includes a capacitor element whose oxide film is thicker than the respective oxide films of the other capacitor elements, as compared with the solid electrolytic capacitor of Comparative example 1 that includes the capacitor elements whose respective oxide films have almost the same thickness.

Example 2

One capacitor element whose oxide film has a thickness of 66 nm and four capacitor elements whose respective oxide films have a thickness of 21 nm were laminated and were sealed with an exterior resin, whereby a solid electrolytic capacitor of Example 2 was produced.

Example 3

One capacitor element whose oxide film has a thickness of 33 nm and seven capacitor elements whose respective oxide films have a thickness of 21 nm were laminated and were sealed with an exterior resin, whereby a solid electrolytic capacitor of Example 3 was produced.

Example 4

One capacitor element whose oxide film has a thickness of 66 nm and seven capacitor elements whose respective oxide films have a thickness of 21 nm were laminated and were sealed with an exterior resin, whereby a solid electrolytic capacitor of Example 4 was produced.

Example 5

One capacitor element whose oxide film has a thickness of 45 nm and seven capacitor elements whose respective oxide films have a thickness of 21 nm were laminated and were sealed with an exterior resin, whereby a solid electrolytic capacitor of Example 5 was produced.

Example 6

One capacitor element whose oxide film has a thickness of 80 nm and seven capacitor elements whose respective oxide films have a thickness of 21 nm were laminated and were sealed with an exterior resin, whereby a solid electrolytic capacitor of Example 6 was produced.

Example 7

One capacitor element whose oxide film has a thickness of 100 nm and seven capacitor elements whose respective oxide films have a thickness of 21 nm were laminated and were sealed with an exterior resin, whereby a solid electrolytic capacitor of Example 7 was produced.

For the solid electrolytic capacitor of each of Example 2, Example 3, Example 4, Example 5, Example 6, and Example 7, the initial value of the ESR was measured by the above-described method. Furthermore, for these solid electrolytic capacitors, the high temperature load test in which the solid electrolytic capacitors left at 125° C. for 1000 hours was conducted, and then the ESR was measured.

The capacitor elements constituting the solid electrolytic capacitor of Example 2 and the measurement result of the ESR are shown in Table 3, the capacitor elements constituting the solid electrolytic capacitor of Example 3 and the measurement result of the ESR are shown in Table 4, the capacitor elements constituting the solid electrolytic capacitor of Example 4 and the measurement result of the ESR are shown in Table 5, the capacitor elements constituting the solid electrolytic capacitor of Example 5 and the measurement result of the ESR are shown in Table 6, the capacitor elements constituting the solid electrolytic capacitor of Example 6 and the measurement result of the ESR are shown in Table 7, and the capacitor elements constituting the solid electrolytic capacitor of Example 7 and the measurement result of the ESR are shown in Table 8.

TABLE 3

| Example 2 | |
|---|---|
| Element | Oxide film thickness |
| 1 | 66 nm |
| 2 | 21 nm |
| 3 | 21 nm |
| 4 | 21 nm |
| 5 | 21 nm |

| ESR | |
|---|---|
| Initial value | 125° C./1000 hr |
| 20 mΩ | 30 mΩ |

TABLE 4

| Example 3 | |
|---|---|
| Element | Oxide film thickness |
| 1 | 33 nm |
| 2 | 21 nm |
| 3 | 21 nm |
| 4 | 21 nm |
| 5 | 21 nm |
| 6 | 21 nm |
| 7 | 21 nm |
| 8 | 21 nm |

| ESR | |
|---|---|
| Initial value | 125° C./1000 hr |
| 16 mΩ | 30 mΩ |

TABLE 5

| Example 4 | |
|---|---|
| Element | Oxide film thickness |
| 1 | 66 nm |
| 2 | 21 nm |
| 3 | 21 nm |
| 4 | 21 nm |
| 5 | 21 nm |
| 6 | 21 nm |
| 7 | 21 nm |
| 8 | 21 nm |

| ESR | |
|---|---|
| Initial value | 125° C./1000 hr |
| 16 mΩ | 25 mΩ |

TABLE 6

| Example 5 | |
|---|---|
| Element | Oxide film thickness |
| 1 | 45 nm |
| 2 | 21 nm |
| 3 | 21 nm |
| 4 | 21 nm |
| 5 | 21 nm |
| 6 | 21 nm |
| 7 | 21 nm |
| 8 | 21 nm |

| ESR | |
|---|---|
| Initial value | 125° C./1000 hr |
| 16 mΩ | 28 mΩ |

TABLE 7

| Example 6 | |
|---|---|
| Element | Oxide film thickness |
| 1 | 80 nm |
| 2 | 21 nm |
| 3 | 21 nm |
| 4 | 21 nm |
| 5 | 21 nm |

TABLE 7-continued

| Example 6 | |
|---|---|
| 6 | 21 nm |
| 7 | 21 nm |
| 8 | 21 nm |

| ESR | |
|---|---|
| Initial value | 125° C./1000 hr |
| 16 mΩ | 23 mΩ |

TABLE 8

| Example 7 | |
|---|---|
| Element | Oxide film thickness |
| 1 | 100 nm |
| 2 | 21 nm |
| 3 | 21 nm |
| 4 | 21 nm |
| 5 | 21 nm |
| 6 | 21 nm |
| 7 | 21 nm |
| 8 | 21 nm |

| ESR | |
|---|---|
| Initial value | 125° C./1000 hr |
| 16 mΩ | 20 mΩ |

From Table 2 and Table 3, it was confirmed that a change of the ESR with time is suppressed, as a difference in the thicknesses of oxide films is larger.

From Table 2 and Table 4, it was confirmed that the initial value of the ESR is low and a change of the ESR with time becomes small, as the number of capacitor elements having thin oxide films is larger, and as the total number of capacitor elements is larger, that is, at least six elements or more.

From Table 4 through Table 8, similarly to Table 2 and Table 3, it was confirmed that as a difference in the thicknesses of oxide films is larger, a change of the ESR with time is suppressed.

DESCRIPTION OF REFERENCE SYMBOLS

1: solid electrolytic capacitor
10: capacitor element
11: valve action metal base
12: dielectric layer made from oxide film
13: cathode layer
13a: solid electrolyte layer
13b: current collecting layer
20: insulating layer
21: anode portion
22: cathode portion
31: exterior resin
32: anode terminal
33: cathode terminal

The invention claimed is:

1. A solid electrolytic capacitor comprising:
a plurality of capacitor elements laminated in parallel; and
a resin sealing the plurality of capacitor elements,
wherein
each of the plurality of capacitor elements includes:
a valve action metal base;
an oxide film dielectric layer on a surface of the valve action metal base; and
a cathode layer on a surface of the oxide film dielectric layer, and
a first thickness of the oxide film dielectric layer of at least one first capacitor element of the plurality of capacitor elements is greater than a second thickness of the oxide film dielectric layer of a second capacitor element of the plurality of capacitor elements, and
a first area of the cathode layer of the at least one first capacitor element and a second area of the second capacitor element of the plurality of capacitor elements are substantially the same.

2. The solid electrolytic capacitor according to claim 1, wherein, among the plurality of capacitor elements, a thickness of a thickest of the oxide film dielectric layers is 1.5 times or more a thickness of a thinnest of the oxide film dielectric layers.

3. The solid electrolytic capacitor according to claim 1, wherein, among the plurality of capacitor elements, a thickness of a thickest of the oxide film dielectric layers is 2.0 times or more a thickness of the thinnest of the oxide film dielectric layers.

4. The solid electrolytic capacitor according to claim 1, wherein, among the plurality of capacitor elements, a thickness of a thickest of the oxide film dielectric layers is 3.0 times or more a thickness of the thinnest of the oxide film dielectric layers.

5. The solid electrolytic capacitor according to claim 1, wherein, among the plurality of capacitor elements, a thickness of a thickest of the oxide film dielectric layers is 3.5 times or more a thickness of the thinnest of the oxide film dielectric layers.

6. The solid electrolytic capacitor according to claim 1, wherein, among the plurality of capacitor elements, a thickness of a thickest of the oxide film dielectric layers is 4.0 times or more a thickness of the thinnest of the oxide film dielectric layers.

7. The solid electrolytic capacitor according to claim 1, wherein, among the plurality of capacitor elements, a thickness of a thickest of the oxide film dielectric layers is 4.5 times or more a thickness of the thinnest of the oxide film dielectric layers.

8. The solid electrolytic capacitor according to claim 1, wherein, among the plurality of capacitor elements, a thickness of a thickest of the oxide film dielectric layers is 1.5 times to 20 times a thickness of the thinnest of the oxide film dielectric layers.

9. The solid electrolytic capacitor according to claim 1, wherein the at least one first capacitor element is disposed on an end portion of the laminated plurality of capacitor elements.

10. The solid electrolytic capacitor according to claim 9, wherein a thickness of the oxide film dielectric layer is the same in all of the plurality of capacitor elements other than the at least one first capacitor element.

11. The solid electrolytic capacitor according to claim 1, wherein a thickness of the oxide film dielectric layer is the same in all of the plurality of capacitor elements other than the at least one first capacitor element.

* * * * *